July 2, 1929.   J. T. COLLINS   1,719,652
OPHTHALMIC LENS THICKNESS CALIPER
Filed Oct. 20, 1925
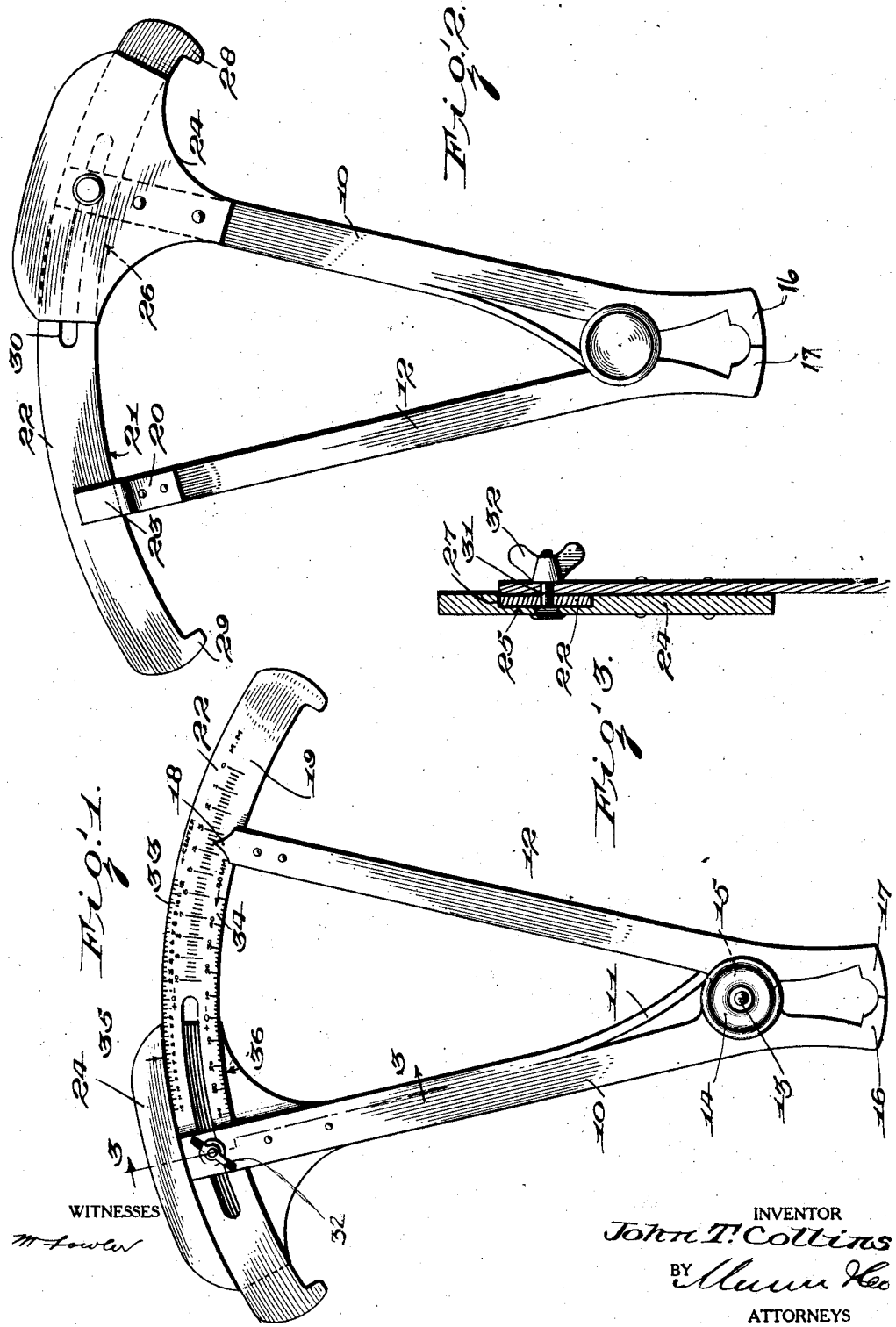
INVENTOR
John T. Collins
BY
ATTORNEYS Patented July 2, 1929.

1,719,652

UNITED STATES PATENT OFFICE.

JOHN TOWNSEND COLLINS, OF CHARLESTON, WEST VIRGINIA.

OPHTHALMIC-LENS-THICKNESS CALIPER.

Application filed October 20, 1925. Serial No. 63,745.

This invention relates to a device for use in measuring lenses, which has for its object the provision of a gage for measuring the thickness of optical lenses while located on the block during the process of servicing.

A further object of the invention is the provision of a gage for measuring the thickness of the center of a lens during process of servicing and also the thickness of the lens at a radius of twenty millimeters from the center, the gage being also employed for determining the diopters and fractions of diopters, either plus or minus.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:—
Figure 1 is a front view of my device,
Figure 2 is a rear view of the same, and
Figure 3 is a vertical section taken along the line 3—3 of Figure 1.

Referring more particularly to the drawings, 10 designates the stationary arm having a spring member 11 projecting from the lower edge of the stationary arm and adapted to engage the lower end of a movable arm 12. These arms are pivotally connected as shown at 13 by means of a substantially semi-circular perforated disk 14 formed integrally with the movable arm 12 and a pair of disks 15 embracing opposite faces of the disk 14 and held together by a pin 13 so that the disk 14 connected with the arm 12 is located between the disks 15.

The lower end of the arm 10 has an inwardly projecting lug 16 adapted to engage the inwardly projecting lug 17 on the arm 12.
These lugs are of sufficient length to limit the outward movement of the arm 12 from the stationary arm 10 to a predetermined angle as shown in Figure 1. In this position the arm 12 is movable towards the arm 10 during the measurement of the lens.

At the extreme upper end of the arm 12 a pointer 18 is provided and is adapted to ride over the scale 19 which is divided into millimeters and fractions of millimeters.
The scale being graduated from 0 to 10. A guide or rest 20 is secured to the back of the movable arm 12.

To the rear of the arm 10 is riveted a plate 24, which has a slot 25 to receive the arcuately shaped member 22. The bottom edge of the slot 25, as shown at 26, is curved to conform to the curvature of the lower edge 21 of the member 22. The arm 10 terminates adjacent the upper edge 27 of the slot 25 which is likewise curved to conform to the curvature of the upper edge of the member 22. Since the plate 24 is riveted to the arm 10 and the upper end of the arm 10 terminates adjacent the upper end of the slot 25, the arcuately shaped member 22 will be held against displacement from said slot. Furthermore, lugs 28 and 29 depending from the opposite edges of the member 22 are adapted to aid in preventing displacement of the member 22 from its position within the slot 25, and the rest of the plate 20 of the movable arm 12.

The member 22 is provided with the arcuately shaped slot 30 upon opposite sides of the arm 10 so that when a set screw 31 is mounted in the plate 24 and passed through a perforation in the arm 10 and through the slot 30, said screw will permit a limited sliding movement of the member 22 in the slot 25. A nut 32 on the threaded end of the set screw 31 is adapted to lock the arcuately shaped member 22 against movement. The arm 12 being in engagement with the spring 11 is urged away from the arm 10 at all times.

On opposite sides of the arcuately disposed scale 19 are provided scales 33 and 34 adapted for use in certain determinations when the lens blanks are made in sizes having a diameter of approximately 47 mm. The scale 33 is adapted to indicate the diopters of a lens, either plus or minus and at the center of said lens, while scale 34 is adapted to indicate the diopters of a lens, either plus or minus at substantially twenty millimeters from the center of said lens. The plus diopters being disposed at one side of the zero while the minus diopters are disposed on the other side of the zero point on the scale. Arrow 35 on the front of the plate 24 is so positioned that when the device is in operation for measuring the diopters at the center of the lens, the said arrow will indicate the proper designation on the scale 33 while an arrow 36 on plate 24 and below the movable member 22 is adapted to point to the diopters which are determined at points twenty millimeters from the center of the lens.

In order to determine the thickness of the center of the lens, scale 33 is set to the number that represents the dioptric power of the lens. The edge of the lens is then placed between the points 16 and 17 and the thickness of the center is read in millimeters on scale 22. If it be desired to determine the thickness of the lens at 20 millimeters from the center the scale 34 is set to the number that represents the strength of the lens in diopters and the edge of the lens is placed between the points 16 and 17 and the thickness in millimeters is read on the scale 22.

The device may be employed also to determine the thickness of the edge when the thickness of the center of the lens is known. If the surface grinder has a fragment of a broken lens that he desires to duplicate the scale 33 is set to the dioptric power of the lens so that if the power is plus it is placed at minus and if the power is minus the scale is set at plus and the fragment is grasped between the points 16 and 17 at the spot where the optical center would be and the edge thickness of the lens 47 millimeters in diameter is read on scale 22.

In order to find the center thickness of a lens of known dioptric power, the set screw 32 should be loosened so that the member 22 may be moved relative to the plate 24 until the number plus or minus which represents the dioptric power of the lens is alined with the arrow 35 of the plate 24. The points 16 and 17 are then engaged by the opposite faces of the lens, and the point 18 of the arm 12 will then have been moved to a number on the scale 19. This number represents the thickness of the center of the lens in millimeters, and fractions.

In order to find the thickness of the lens at 20 mm. from the center of a lens of known dioptric power, the member 22 is moved so that the arrow 36 will point to a number on the scale 34, which represents the dioptric power of the lens (plus or minus). The edge of the lens 13 is then located between the points 16 and 17 and in engagement with said points whereby the pointer 18 of the arm 12 will aline with a number on the scale 19, which will represent the thickness of the lens at a point twenty millimeters from the center (the edge thickness of the cut lens, 40 millimeters in diameter). This indication will be in millimeters and fractions. It is a well known fact that ophthalmic lens blanks are made in sizes having a diameter of approximately forty-seven millimeters, and for this size blanks the device is adapted to be particularly employed. If other sizes of blanks are employed the scale on the member 22 must be graduated accordingly.

What I claim is:—

1. A device of the character described comprising an arm, a second arm pivotally connected with the first mentioned arm, said arms being pivotally connected together intermediate the ends thereof, and said arms being provided with lens engaging members at one of the adjacent ends thereof, an arcuately-shaped member slidably mounted on the opposite end of the first mentioned arm in a manner to be always concentric with the pivot of said arms and provided with graduations indicating in co-operation with the corresponding end of the second arm the diopters at the center of the lens and also the diopters at points twenty millimeters from said center, said arcuately shaped member being provided with graduations forming a scale for indicating in millimeters so that when the lens engaging members are in contact with the opposite faces of the lens the thickness of the center of the lens may be determined.

2. A device of the character described comprising an arm, a second arm pivotally connected with the first mentioned arm, said arms being pivotally connected together intermediate the ends thereof, and said arms being provided with lens engaging members at one of the adjacent ends thereof, an arcuately shaped member slidably mounted on the opposite end of the first mentioned arm in a manner to be always concentric with the pivot of said arms and provided with graduations indicating in co-operation with the corresponding end of the second arm the diopters at the center of the lens and also the diopters at points twenty millimeters from said center, said arcuately shaped member being provided with graduations forming a scale for indicating in millimeters so that when the lens engaging members are in contact with the opposite faces of the lens the thickness of the center of the lens may be determined, said arcuately shaped member having an arcuately shaped slot and a set screw mounted on the first mentioned arm and passing through the slot for locking the arcuately-shaped member against movement.

3. A device of the character described comprising an arm, a second arm pivotally connected with the first mentioned arm, said arms being pivotally connected together intermediate the ends thereof, and said arms being provided with lens engaging members at one of the adjacent ends thereof, an arcuately shaped member slidably mounted on the opposite end of the first mentioned arm in a manner to be always concentric with the pivot of said arms and provided with graduations indicating in co-operation with the corresponding end of the second arm the diopters at the center of the lens and also the diopters at points twenty millimeters from said center, said arcuately shaped member being provided with graduations forming a scale for indicating in millimeters so that when the lens engaging members are in contact with the opposite faces of the lens the thickness of the center of the lens may be determined, said first mentioned arm having an enlargement provided with a guide to receive the arcuate member and means for locking said member against movement.

4. A device of the character described comprising an arm, a second arm pivotally connected with the first mentioned arm, said arms being pivotally connected together intermediate the ends thereof, and said arms being provided with lens engaging members at one of the adjacent ends thereof, an arcuately shaped member slidably mounted on the opposite end of the first mentioned arm in a manner to be always concentric with the pivot of said arms and provided with graduations indicating in co-operation with the corresponding end of the second arm the diopters at the center of the lens and also the diopters at points twenty millimeters from said center, said arcuately shaped member being provided with graduations forming a scale for indicating in millimeters so that when the lens engaging members are in contact with the opposite faces of the lens the thickness of the center of the lens may be determined, said second mentioned arm having a guide to receive the arcuately shaped member, lugs carried by the arcuately shaped member and engaging with the guide for limiting sliding movement of said member, and a spring for maintaining the second arm in angularly spaced relation with the first mentioned arm.

JOHN TOWNSEND COLLINS.